US008726239B2

(12) United States Patent
de Halleux et al.

(10) Patent No.: US 8,726,239 B2
(45) Date of Patent: May 13, 2014

(54) GENERATING TYPE-SAFE WRAPPERS FOR DYNAMIC DETOURING

(75) Inventors: Jonathan Paul de Halleux, Seattle, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 12/773,911

(22) Filed: May 5, 2010

(65) Prior Publication Data

US 2011/0276943 A1    Nov. 10, 2011

(51) Int. Cl.
*G06F 9/44* (2006.01)
(52) U.S. Cl.
USPC .................... 717/124; 717/130; 14/16; 14/37
(58) Field of Classification Search
USPC .................. 717/124–167; 714/15–24, 37–39, 714/799–824
See application file for complete search history.

(56) References Cited

U.S. PATENT DOCUMENTS

| | | | | |
|---|---|---|---|---|
| 5,651,111 | A * | 7/1997 | McKeeman et al. | 714/38.1 |
| 6,546,553 | B1 * | 4/2003 | Hunt | 717/174 |
| 6,907,546 | B1 * | 6/2005 | Haswell et al. | 714/38.11 |
| 7,096,460 | B1 * | 8/2006 | Banning et al. | 717/136 |
| 8,347,271 | B1 * | 1/2013 | Nallasivam | 717/132 |
| 2004/0031020 | A1 * | 2/2004 | Berry et al. | 717/130 |
| 2005/0091638 | A1 * | 4/2005 | Bley | 717/111 |
| 2005/0149914 | A1 | 7/2005 | Krapf et al. | |
| 2007/0011669 | A1 | 1/2007 | Varma et al. | |
| 2007/0089090 | A1 | 4/2007 | Riedl et al. | |
| 2009/0210796 | A1 | 8/2009 | Bhogal et al. | |
| 2010/0037100 | A1 * | 2/2010 | Lopian | 714/35 |

OTHER PUBLICATIONS

De Halleux et al., "Moles Lightweight Test Stubs and Detours for .NET Tutorial," Microsoft Corporation, Redmond, WA, Jan. 28, 2010, pp. 1-23.*
Hunt et al., "Detours: Binary Interception of Win32 Functions," Proceedings of the 3rd USENIX Windows NT Symposium, Jul. 1999, pp. 1-9.*
Madeyski, "The Impact of Pair Programming and Test-Driven Development on Package Dependencies in Object-Oriented Design an Experiment," Springer-Verlag Berlin Heidelberg, PROFES 2006, LNCS 4034, pp. 278-289.*
Freeman et al., "Mock Roles, Not Objects," ACM 2004, pp. 236-246.*
Kniesel, "Type-Safe Delegation for Run-Time Component Adaptation", Springer-Verlag Berlin Heidelberg, 1999, pp. 351-366.*

(Continued)

*Primary Examiner* — Satish Rampuria
(74) *Attorney, Agent, or Firm* — Dan Choi; Carole Boelitz; Micky Minhas

(57) ABSTRACT

An isolation system is described for converting original product code into corresponding modified code. The isolation system operates by identifying a subset of original methods to be converted. For each such original method, the isolation system generates a modified part having at least one property with a type-safe delegate type which matches a signature of the original method. Test code, which tests the product code, can then associate a delegate instance to the thus-defined property of the original method. This prompts an execution system to dynamically execute detour code associated with the delegate instance, rather than an instrumentation of the original method, thus avoiding dependency on potentially non-deterministic functionality which would be otherwise invoked by an instrumentation of the original method.

20 Claims, 12 Drawing Sheets

(56) References Cited

OTHER PUBLICATIONS

Leitner, Andreas, "Contract-Based Tests in the Software Process and Environment," version retrieved at <<http://e-collection.ethbib.ethz.ch/eserv.php?pid=eth:41677&dsID=eth-41677-02.pdf>>, Dissertation, ETH Zurich, No. 18072, 2008, 168 pages.

Truyen, et al., "On Interaction Refinement in Middleware," version retrieved at <<http://www.cs.kuleuven.ac.be/~eddy/PUBLICATIONS/eddyTruyenWCOP2000.pdf>>, Proceedings of the 5th International Workshop on Component-Oriented Programming, 2000, 7 pages.

Kniesel, Gunter, "Type-Safe Delegation for Run-Time Component Adaptation," version retrieved at <<http://www.ifs.uni-linz.ac.at/~ecoop/cd/papers/1628/16280351.pdf>>, Proceedings of the 13th European Conference on Object-Oriented Programming, LNCS 1628, pp. 351-366.

Robby, et al., "Bogor: A Flexible Framework for Creating Software Model Checkers," Proceedings of the Testing: Academic & Industrial Conference on Practice and Research Techniques, 2006, 16 pages.

De Halleux, et al., "Moles Lightweight Test Stubs and Detours for .NET Tutorial," version retrieved at <<http://research.microsoft.com/en-us/projects/pex/stubstutorial.pdf>>, Microsoft Corporation, Redmond, WA, Jan. 28, 2010, 23 pages.

De Halleux, et al., "Unit Testing SharePoint Services," version retrieved at <<http://research.microsoft.com/en-us/projects/pex/pexsharepoint.pdf>>, Microsoft Corporation, Redmond, WA, Mar. 31, 2010, 41 pages.

"Pex and Moles," documentation homepage, version retrieved at <<http://research.microsoft.com/en-us/projects/pex/documentation.aspx>>, retrieved on Apr. 29, 2010, Microsoft Corporation, Redmond, WA, 2 pages.

Elbaum, et al., "Carving Differential Unit Test Cases from System Test Cases," version retrieved at <<http://delivery.acm.org>>, Proceedings of the 14th ACM SIGSOFT International Symposium on Foundations of Software Engineering, 2006, pp. 253-264.

Godefroid, et al., "DART: Directed Automated Random Testing," version retrieved at <<http://delivery.acm.org>>, Proceedings of the 2005 ACM SIGPLAN Conference on Programming Language Design and Implementation, 2005, pp. 213-223.

Hunt, et al., "Detours: Binary Interception of Win32 Functions," version retrieved at <<http://research.microsoft.com/pubs/68568/huntusenixnt99.pdf>>, Proceedings of the 3rd USENIX Windows NT Symposium, Jul. 1999, 9 pages.

"The JMockit Testing Toolkit," version retrieved at <<http://jmockit.googlecode.com/svn/trunk/www/about.html>>, retrieved on Apr. 29, 2010, JMockit Developers, 6 pages.

Joshi, et al., "SCARPE: A Technique and Tool for Selective Capture and Replay of Program Executions," version retrieved at <<http://www.cc.gatech.edu/~orso/papers/joshi.orso.pdf>>, Proceedings of the 23rd IEEE International Conference on Software Maintenance (ICSM 2007), 2007, 10 pages.

Feathers, Michael, Working Effectively with Legacy Code, Prentice Hall, 2004, Amazon.com product page only, retrieved at <<http://www.amazon.com/Working-Effectively-Legacy-Michael-Feathers/dp/0131177052/ref=sr_1_1?ie=UTF8&s=books&qid=1272541151&sr=8-1>>, retrieved on Apr. 29, 2010, 7 pages.

Fowler, et al., "Refactoring: Improving the Design of Existing Code," Addison-Wesley Professional, 1999, Amazon.com product page only, retrieved at <<http://www.amazon.com/Refactoring-Improving-Design-Existing-Code/dp/0201485672/ref=sr_1_1?ie=UTF8&s=books&qid=1272541345&sr=1-1>>, 10 pages.

Musuvathi, et al., "Finding and Reproducing Heisenbugs in Concurrent Programs," version retrieved at <<http://www.usenix.org/event/osdi08/tech/full_papers/musuvathi/musuvathi.pdf>>, 8th USENIX Symposium on Operating Systems Design and Implementation, 2008, pp. 267-280.

Orso, et al., "Isolating Relevant Component Interactions with JINSI," version retrieved at <<http://delivery.acm.org>>, Proceedings of the Fourth International ICSE Workshop on Dynamic Analysis, 2006, pp. 3-10.

"Pex and Moles—Isolation and White box Unit Testing for .NET Pex," version retrieved at <<http://research.microsoft.com/en-us/projects/pex/>>, Microsoft Corporation, Redmond, WA, 3 pages.

Saff, et al., "Automatic Test Factoring for Java," version retrieved at <<http://delivery.acm.org>>, Proceedings of the 20th IEEE/ACM International Conference on Automated Software Engineering, 2005, pp. 114-123.

Tillmann, et al., "Pex—White box test generation for .NET," version retrieved at <<http://research.microsoft.com/pubs/81193/fulltext.pdf>>, Proceedings of Tests and Proofs (TAP'08), vol. 4966 of LNCS, Springer, 2008, 20 pages.

Tillmann, et al., "Parameterized Unit Tests," version retrieved at <<http://delivery.acm.org>>, ACM SIGSOFT Software Engineering Notes, vol. 30, Issue 5, 2005, pp. 253-262.

"Isolator 2010," version retrieved at <<http://site.typemock.com/typemock-isolator-product/>>, retrieved on Apr. 29, 2010, Typemock Ltd, 3 pages.

Xu, et al., "Efficient Checkpointing of Java Software Using Context-Sensitive Capture and Replay," version retrieved at <<http://delivery.acm.org>>, Proceedings of the 6th Joint Meeting of the European Software Engineering Conference and the ACM SIGSOFT Symposium on the foundations of Software Engineering, 2007, pp. 85-94.

"Detours," retrieved at <<http://research.microsoft.com/en-us/projects/detours/#publications>>, retrieved on Apr. 29, 2010, project homepage, 2 pages.

\* cited by examiner

EXAMPLE OF MODIFIED PART FOR A STATIC METHOD
602

```
static Func NowGet {
    set { // property setter has implicit 'value' parameter
        Method method = typeof(DateTime).GetMethod("get_Now");
        if (value == null)
            _Detours.DetachDetour(null, method);
        else
            _Detours.AttachDetour(null, method, value);
    }
}
```

EXAMPLE OF MODIFIED PART FOR AN INSTANCE METHOD (ALL INSTANCES)
604

```
static Func ComputeInt32Int32 {
    set { // property setter has implicit 'value' parameter
        Method method = typeof(ComputeType).GetMethod("Compute",
            new Type[] { typeof(int), typeof(int) });
        if (value == null)
            _Detours.DetachDetour(null, method);
        else
            _Detours.AttachDetour(null, method, value);
    }
}
```

EXAMPLE OF MODIFIED PART FOR AN INSTANCE METHOD (SPECIFIC INSTANCE)
606

```
Func ComputeInt32Int32 {
    set { // property setter has implicit 'value' parameter
        Method method = typeof(ComputeType).GetMethod("Compute",
            new Type[] { typeof(int), typeof(int) });
        if (value == null)
            _Detours.DetachDetour(this.Instance, method);
        else
            _Detours.AttachDetour(this.Instance, method, value);
    }
}
```

GENERATING TYPE-SAFE WRAPPERS FOR DYNAMIC DETOURING

BACKGROUND

A developer will typically test product code before it is released. In one approach, the developer may devise a collection of unit tests to perform on the product code. Each unit test investigates the behavior of a particular part of the product code. The unit tests preferably provide dependable conclusions that can be reliably reproduced. However, product code often makes reference to functionality "outside" the control of the product code. For example, product code can make reference to a file system, system clock, network resource, etc. In each of these cases, the product code itself cannot ensure that the referenced functionality will operate in a deterministic manner. This makes the developer's unit tests potentially unreliable, essentially rendering them, at least in part, integration tests. Integration tests are not isolated from the potential non-determinism of the execution environment.

Some languages and associated execution systems allow a developer to dynamically redefine methods during execution of the product code. This technique presents one way to eliminate dependency on potentially non-deterministic environments. However, other languages and associated execution systems provide static checking and static binding. The programming languages that run on the .NET® framework are examples of such languages. The static checking and binding prevent methods from being redefined at runtime in the direct manner of, for example, JavaScript®.

SUMMARY

An isolation system is described for converting original product code into corresponding modified code. The modified code allows the original product code to be tested in an isolated manner, that is, without dependencies on potentially non-deterministic functionality. The isolation system operates by identifying a subset of original methods to be converted. For each such original method, the isolation system generates a modified part having at least one property with a type-safe delegate type which matches a signature of the original method. Test code, which tests the product code, can then associate a delegate instance to the thus-defined property. This allows an execution system to dynamically execute instrumented detour code associated with the delegate instance, rather than the instrumented original method, thus avoiding dependency on potentially non-deterministic functionality which would otherwise be invoked by the instrumented original method.

By virtue of the above processing, the isolation system provides a type-safe way of achieving test isolation for programming languages and corresponding execution systems that employ static typing and static binding.

According to another illustrative aspect, the isolation system can employ a caching mechanism when converting the original product code to the modified code. When processing a particular original method, the isolation system will determine whether a corresponding modified part already exists. If so, the isolation system will use this modified part, rather than regenerate the modified part. In another implementation, the isolation system can omit the use of caching.

According to another illustrative aspect, the isolation system can provide different types of properties for different respective types of original methods, such as static methods and instance methods.

According to another illustrative aspect, an execution system can implement dynamic detouring by instrumenting the product code during runtime processing of the product code. In one approach, the instrumented product code queries a detour manager to determine, for each method, whether a detour has been installed for that method. The execution system invokes the instrumented original method code if a detour has not been installed. The execution system invokes instrumented detour code if a detour has been installed.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows different modified parts corresponding to different respective kinds of original methods.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative isolation system for creating modified code, together with an execution system for performing a test using the modified code. Section B describes illustrative methods which explain the operation of the isolation system and execution system of Section A. Section C describes illustrative processing functionality that can be used to implement any aspect of the features described in Sections A and B.

Figure 12:
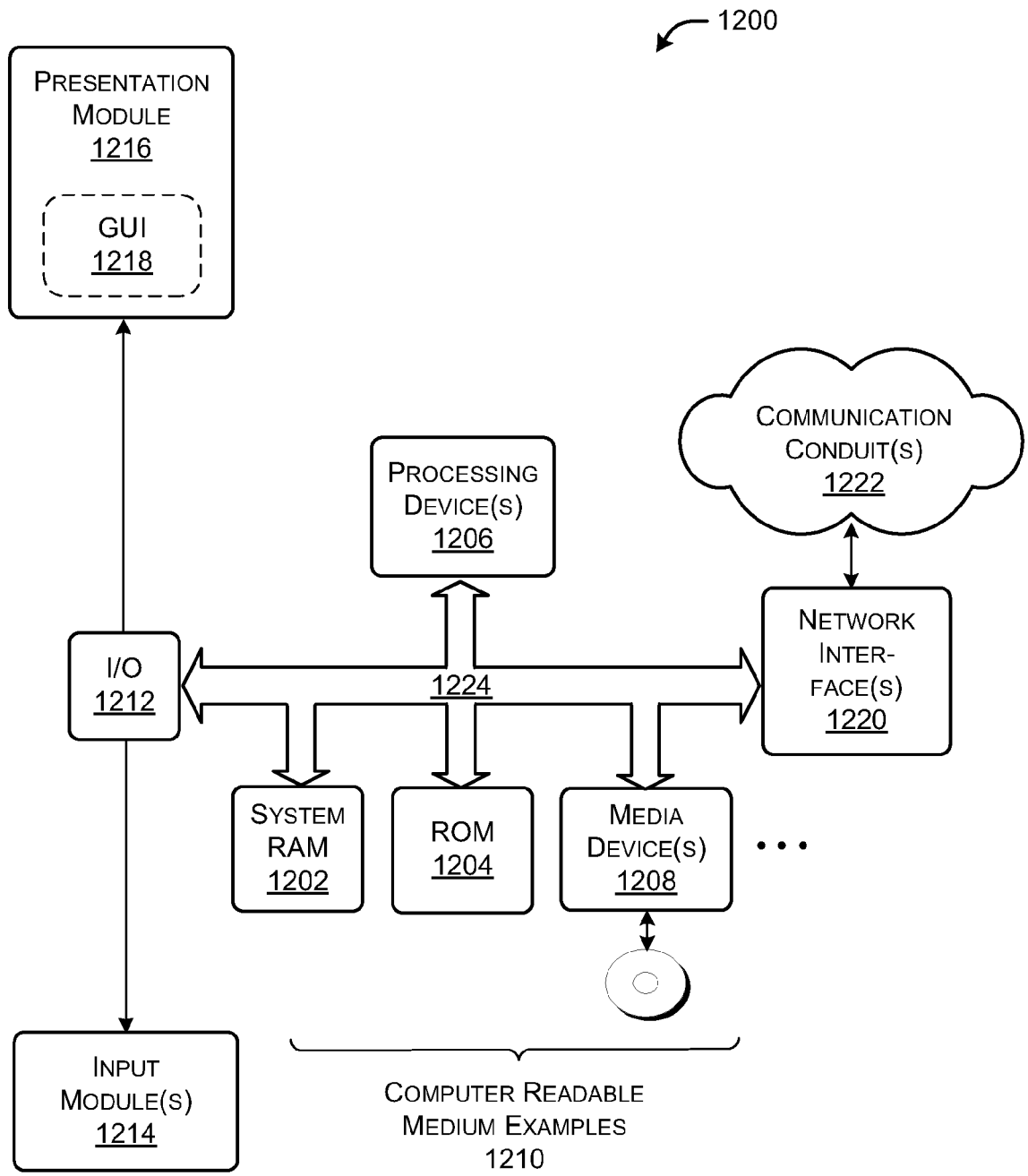
FIG. 12 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 12, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system, a logic component represents a physical component that is a physical part of the computing system, however implemented.

Further, the following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Systems

Figure 1:
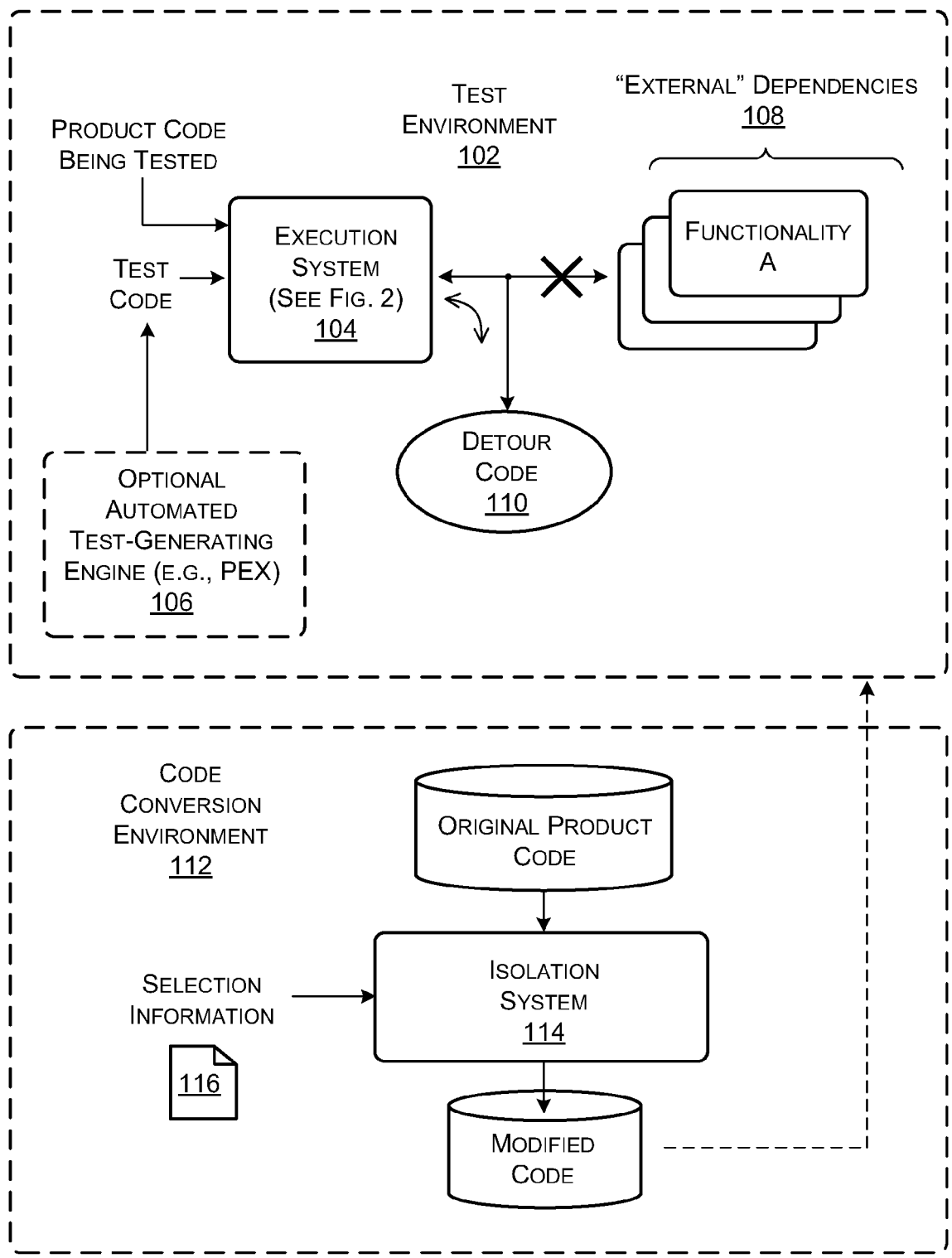
FIG. 1 shows an illustrative environment for converting original product code into modified code, and then for using that modified code to conduct a test in an isolated and type-safe manner.

FIG. 1 shows an overview of functionality 100 for testing product code. In the context of this description, product code refers to software that performs any operation, expressed in any language. In one case, the product code can correspond to plural modules of code. For example, the product code can correspond to a main code module together with a collection of sub-modules that are referenced by the main code module. For example, in an object-oriented language, the collection of sub-modules may form a library of classes.

The functionality 100 includes a test environment 102 in which the product code is tested. That test environment 102 includes an execution system 104 for receiving test code. The test code, in turn, invokes the product code. In one case, the test code may correspond to one or more unit tests. A unit test investigates a typically small part of the product code, e.g., by targeting a particular function performed by the product code. More specifically, a typical unit test operates by feeding a defined input to the product code; the unit test then compares the resultant behavior of the product code with expected behavior. Optionally, one or more engines 106 can be used to automatically generate a suite of unit tests, such as, but not limited to the PEX tool provided by Microsoft® Corporation of Redmond, Wash. PEX is described in various publications, such as Nikolai Tillmann, et al., "Parameterized Unit Tests," *ACM SIGSOFT Software Engineering Notes*, Vol. 30, Issue 5, 2005, pp. 253-262. In addition, or alternatively, a user can manually generate one or more unit tests.

The product code being tested may depend on functionality 108 that is "external" to the execution of the product code itself. This means that the functionality 108 exhibits behavior that is not directly controllable by the product code. This means that the functionality 108 is at least not fully controllable by a test being performed. For example, the product code may call on a network service (such as a Web Service), a hard drive, a database system, a system clock, and so forth. In each case, the product code cannot provide assurances regarding the reliability of the services offered by the external functionality 108. For example, suppose the product code includes a method which involves access to a remote network resource. The performance of that method is dependent on network events, such as dropped packets, congestion, server failures, and so on, all of which cannot be controlled or anticipated by the product code. For that reason, different calls to the external functionality 108 under equivalent test conditions may not yield the same results. That is, the functionality 108 may or may not exhibit non-deterministic behavior.

The potential non-determinism of the external functionality 108 is an undesirable characteristic. This is because the potential non-determinism makes it difficult (or impossible) to establish precise conclusions regarding the behavior of the code under test. To address this problem, the execution system 104 is configured to automatically divert a call to the external functionality 108 so that, instead of accessing the external functionality 108, the product code accesses detour code 110. FIG. 1 depicts this detouring behavior as an "X" mark, which means that the product code's access to the external functionality 108 is effectively blocked. For example, consider the case in which the product code makes reference to a system clock. Instead of this connection, the execution system 104 can be configured to access the detour code 110 which presents a static date. This prevents the potential non-determinism of the actual system clock from biasing the test.

The execution system 104 achieves the above result even for languages (and associated execution frameworks) which normally prevent code from being redefined at runtime. The languages which run in the .NET framework are examples of such languages. These languages include C#, VB.NET, and so on. The following explanation will establish the basis for these statements, starting with a description of a code conversion environment 112.

The code conversion environment 112 includes an isolation system 114 for converting original product code into modified code (also referred to as corresponding modified code). The original product code may correspond to any part of the product code that will be tested by the execution system 104. For example, assume that the product code that is being tested relies on a collection of classes stored in a class library.

The isolation system 114 can process this collection of classes by transforming it from an original form to a modified form. More specifically, assume that the classes used by the product code identify a plurality of original methods. The isolation system 114 transforms the original methods into corresponding modified code parts (referred to, for brevity, as "modified parts" below). The nature of this transformation will be clarified in the context of the discussion of FIG. 3. At this point, suffice it to say that the isolation system 114 produces modified parts that constitute type-safe wrappers. This means that, overall, the functionality 100 shown in FIG. 1 can perform dynamic detouring in a type-safe manner.

More specifically, the type system of a language (and associated execution framework) corresponds to the rules by which the language handles different categories of information items within code. A language (and associated execution framework) is said to be strongly typed when it includes well-defined provisions for ensuring that different information items are handled in an appropriate way. For example, a language that that is strongly typed would prevent a user from performing an arithmetic operation on an information item that is declared as a string. More specifically, the language compiler of such a language would flag this operation as an error, and thereby prevent the code from being compiled and subsequently run. In the context of the functionality 100 of FIG. 1, the ability to guarantee type safety means that the product code can be compiled and executed with modified code without causing errors. In other words, the substitution of the modified code can be done safely because it does not conflict with the type-checking provisions employed by a language and its associated execution framework.

In summary, by way of terminology, the term original product code describes the product code in its original state, e.g., in the format of intermediate language code. The term modified product code describes the product code that has been transformed by the isolation system 114. The term original method refers to a method in the original product code. The term modified part refers to an original method that has been transformed by the isolation system 114. The term detour code (or instrumented detour code) refers to instrumented code that is invoked by the execution system 104 in lieu of instrumented original method code which would otherwise access the functionality 108.

FIG. 1 also shows that the isolation system 114 accepts an input labeled as "selection information." The selection information may identify a subset of original methods within the original product code to be processed. The isolation system 114 uses this selection information as a filtering mechanism, e.g., to pick out and convert the original methods identified by the selection information and ignore the remaining methods. In one case, the isolation system 114 can accept the selection information in the form of a file 116, such as, without limitation, a file containing content expressed in XML, etc.

In one case, the code isolation system 114 is incorporated into a build process. The build process can use a compiler to transform source code to intermediate language code, such as Microsoft® Intermediate Language (MSIL) code. The build process can integrate different parts of code in a linking process. The isolation system 114 can be incorporated into the linking operation performed by the build process.

Figure 2:
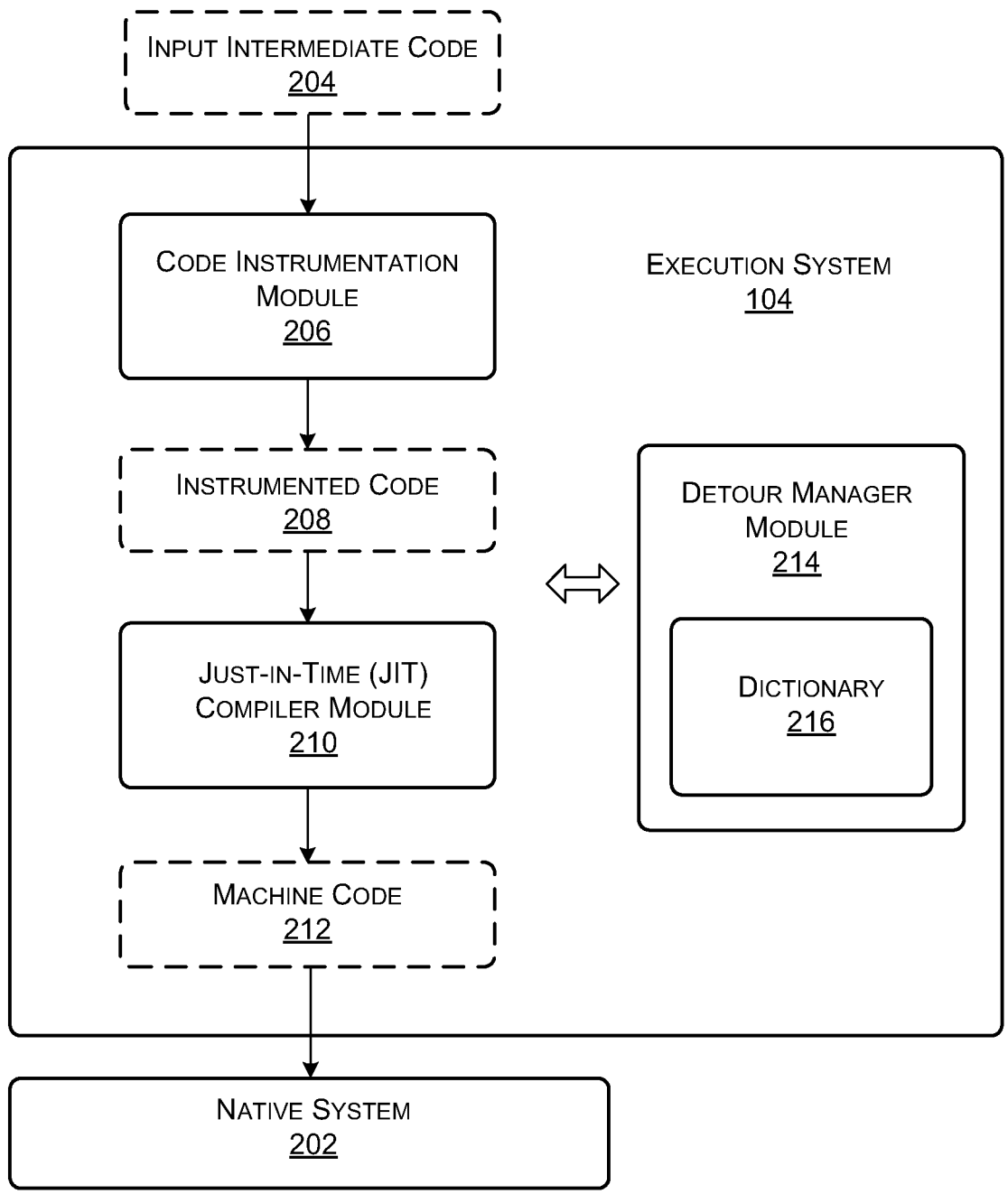
FIG. 2 shows an illustrative execution system for running code, such as test code that is configured to test product code.

Advancing to FIG. 2, this figure shows additional details regarding the execution system 104 of FIG. 1. The execution system 104 may correspond to a virtual machine environment which converts intermediate code into native code for execution on a native system 202. More specifically, the execution system 104 can accept input intermediate code 204 in any form, such MSIL code.

Figure 5:
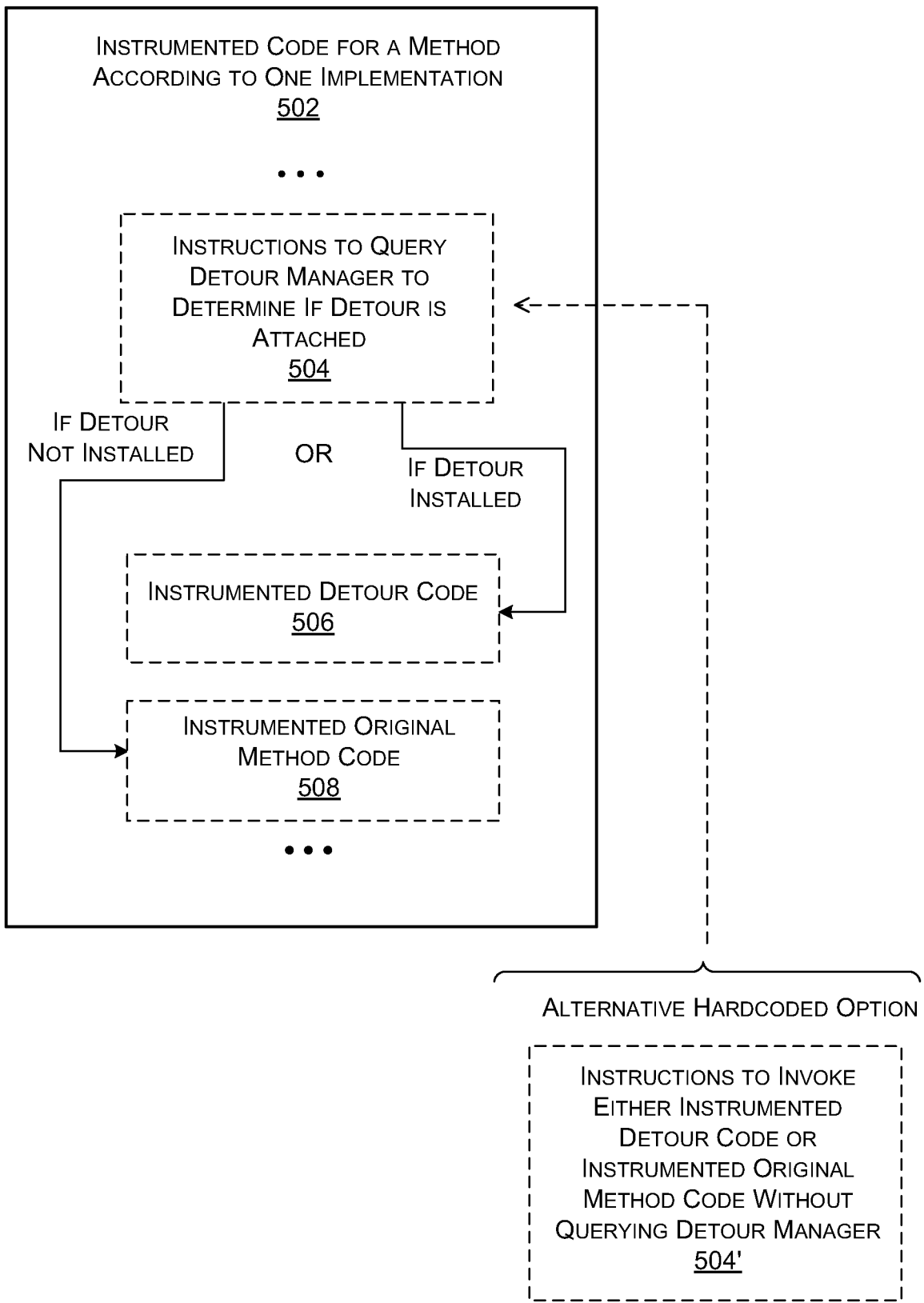
FIG. 5 shows an example of one way that a method can be instrumented at runtime to invoke either detour code or instrumented original method code, e.g., by querying a detour manager.

A code instrumentation module 206 modifies the input intermediate code 204 to produce instrumented code 208. In the context of the detouring described herein, the code instrumentation module 206 can modify the input intermediate code 204 so that it can execute detour code instead of code associated with an instrumented original method (where that instrumented original method involves interaction with the potentially non-deterministic functionality 108). FIG. 5 and the accompanying explanation will provide additional details regarding the operation of the code instrumentation module 206.

A just-in-time (JIT) compiler module 210 converts the instrumented code 208 into machine code (native code) 212 on an on-demand basis. This means that the JIT compiler module 210 converts selected parts of the instrumented code 208 into machine code 212 when those parts are needed in the course of running the program. This is in contrast to systems which compile an entire program into an executable file and then run the program based on the executable file. A native system 202 actually runs the machine code 212 to deliver any type of service provided by the program.

Take altogether, the series of operations performed by the code instrumentation module 206 and JIT compiler module 210 can be regarded as an execution chain. That execution chain converts input intermediate code 204 into the machine code 212 for execution by the native system 202. In the context of the type of testing described herein, the execution chain processes test code. The test code, in turn, references the product code.

A detour manager module 214 provides a service which enables dynamic detouring to take place in a manner to be explained below. By way of overview, the detour manager module 214 can maintain a dictionary 216 which identifies detours that are currently installed for particular methods in the product code. The execution chain of the execution system 104 can interact with the detour manager module 214 to determine, for a particular method, when a detour is installed. If so, the execution chain can dynamically execute the detour code in lieu of the instrumented original method code.

As mentioned above, the execution system 104 provides overall behavior that can be regarded as type-safe in nature. However, the execution system 104 can establish this behavior based on component operations that are, when viewed in isolation, not type safe. For example, aspects of the operation of the detour manager module 214 may not incorporate type-safe provisions, when considered in isolation. This is because, in one implementation, the detour manager module 214 may register detour-related information without regard to type safety.

Figure 3:
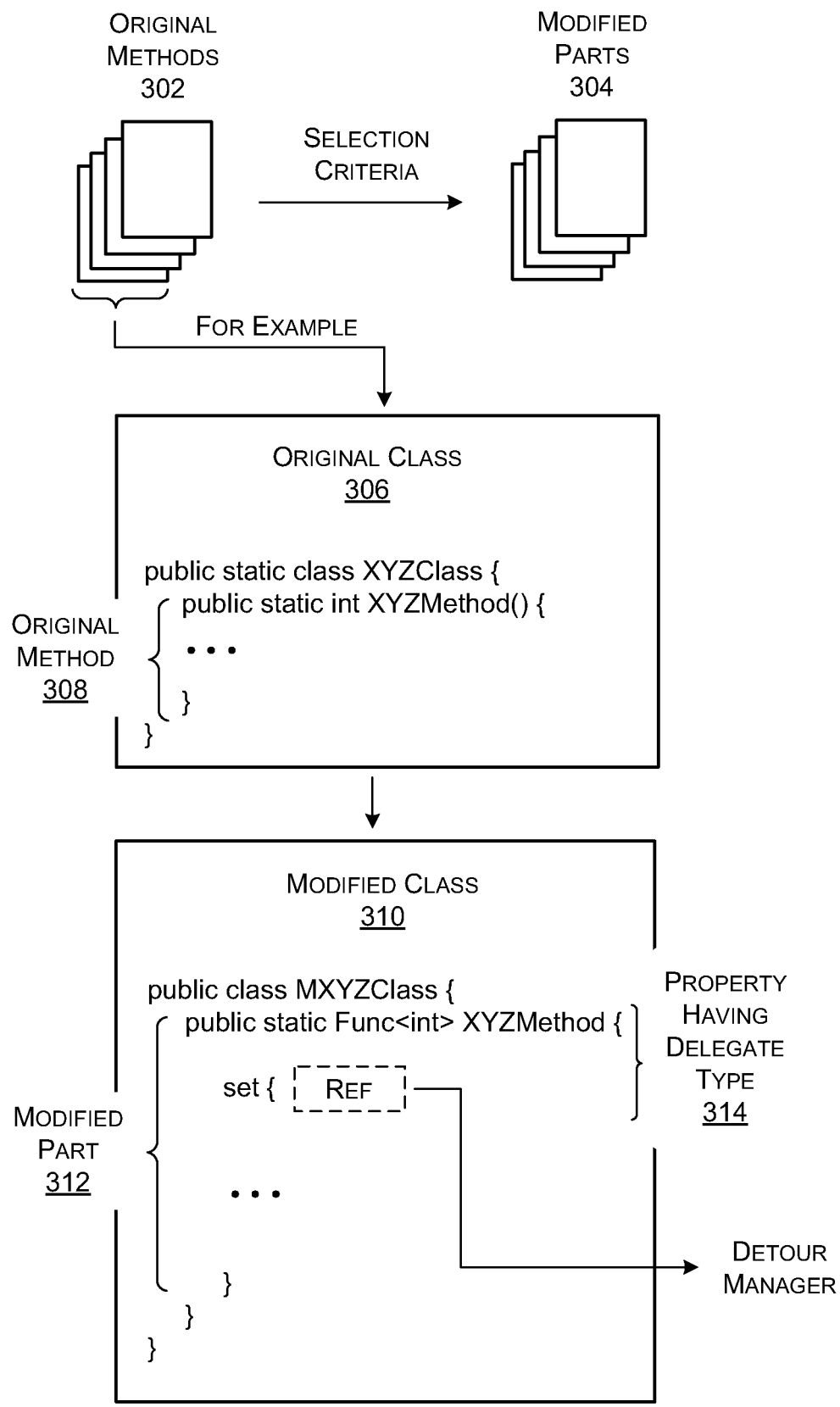
FIG. 3 shows an example of one way in which an original method can be converted to a modified part, the modified part declaring a property of delegate type.

FIG. 3 shows additional information regarding the operation of the isolation system 114 of FIG. 1. To review, the isolation system 114 receives product code to be converted, which may comprise a library that includes a plurality of classes. The plurality of classes, in turn, may define a plurality of original methods 302. The isolation system 114 converts a subset of the original methods 302 into corresponding modified parts 304. Selection information provides criteria for picking out the original methods to be processed.

FIG. 3 shows one illustrative original class 306, named "XYZClass" (which is an arbitrary label). In an object-oriented language, a class can be thought of as a blueprint that defines the characteristics of a particular type of object. The execution system 104 can instantiate the class to create objects (instances) that conform to the class. The original class 306 specifies at least one original method 308, referred to as "XYZMethod" (which is an arbitrary label). A method refers to an action that an object (created based on the class)

can perform. In the present example, the method is qualified as "static." This means that the method acts on the class-level, rather than an individual instance level. (As will be set forth below, the isolation system 114 can also operate on instance methods, which operate on a per-instance basis.)

The isolation system 114 operates on the original class 306 to produce a modified class 310. In one case, the isolation system 114 assigns a name to the modified class 310 which is a variant of the original class name. For example, in one merely illustrative case, the isolation system 114 prepends the letter "M" to the original class name to produce a modified class name of "MXYZClass." A dedicated namespace can encompass all names associated with modified code.

The isolation system 114 can also convert the original method 308 into a modified part 312. More specifically, the modified part 312 can declare a property 314 that has a delegate type. In one programming context, a property corresponds to a way of setting and getting a value associated with an object (e.g., using a get and set operation, respectively). A delegate is function pointer that is type safe. In conventional use, a program may call a method via the delegate. In the merely illustrative example of FIG. 3, the property 314 is represented as "Func <int> XYZMethod . . . ". Other programming languages can express the property using other formats. The property 314 has a function signature which matches a signature of the original method 308, which makes the property type safe. A signature refers to high-level information regarding a method, such as its return values, parameters, etc. More specifically, for a static method of type t with parameter types $T_1, T_2, \ldots, T_n$ and with return type U, the isolation system 114 generates a settable static property that has a delegate type Func similar to the following: delegate U Func $(T_1, T_2, \ldots T_n)$.

The property 314 is associated with a set operation which sets a value associated with the property 314. For example, the property 314 can include an instruction to store the value in the detour manager module 214. This allows the detour manager module 214 to register the fact that a particular method has a detour associated therewith. The execution system 104 may consult this information during runtime to determine whether to run instrumented original method code or corresponding detour code.

Figure 4:
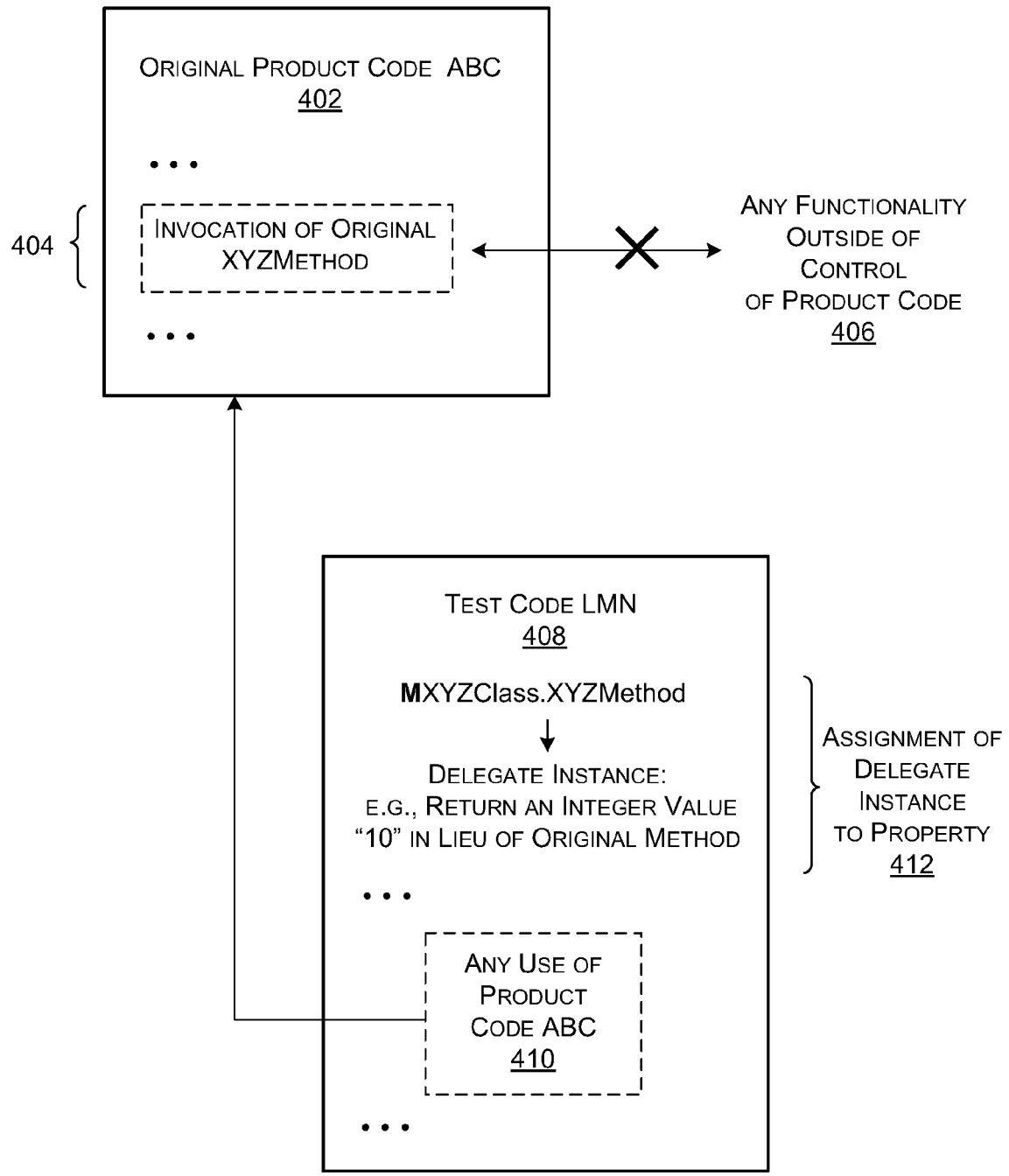
FIG. 4 shows an example of one way in which test code can be modified to associate a delegate instance with the property illustrated in FIG. 3.

Advancing to FIG. 4, this figure shows how the execution system 104 may use the property 314 produced by the isolation system 114. For example, supposed that the user desires to test product code ABC 402. Further suppose that the product code ABC 402 makes reference to the original method 308, as defined by the original class 306. Finally, suppose that the original method 308 makes at least one reference 404 to any functionality 406 that is external to the product code ABC 402 and therefore may (or may not) exhibit behavior that is non-deterministic. Hence, when performing a test on the product code ABC 402, the user will wish to isolate the product code ABC 402 from its external dependency. This will be performed during runtime by executing detour code in lieu of instrumented original method code.

The user next manually or automatically generates test code LMN 408. The test code LMN 408 tests some aspect of the product code ABC 402. Hence, the test code LMN 408 contains at least one invocation 410 of the product code ABC 402. As a first step in shunting the external dependency of the original method 308, the user includes a statement 412 in the test code LMN 408 which assigns the property 314 to a delegate instance. A delegate instance is an instance of the delegate type set forth in the modified class 310. This statement 412 will prompt the execution system 104 to invoke detour code associated with the delegate instance instead of the instrumented original method 308 (and thereby also avoid access to the external functionality 406). In one merely representative case, assume that the detour code is associated with a delegate that always returns an integer value of 10. This number has no significance in and of itself; the return of this value is a mock operation that acts as a stable counterpart to interaction with the external functionality 108.

Note that the coding strategy shown in FIG. 1 does not require the user to modify the original product code ABC 402 that is being tested, beyond those operations performed by the isolation system 114 (which can be performed as part of the build process). In other words, the coding strategy does not require the user to modify the source code of the original method 308. This is advantageous because it avoids potentially tedious and error-prone code modification. At the same time, the coding strategy maintains type safety, which means that the test code LMN 408 (and referenced product code ABC 402) can be successfully compiled and run without generating a type-related error.

Assume now that the user instructs the execution system 104 to execute the test code LMN 408 that includes the shunting statement 412. In response, the code instrumentation module 206 can instrument the methods in the test code LMN 408 in a manner that enables dynamic detouring to be performed on the test code LMN 408 (at runtime).

For example, FIG. 5 shows one way (among many possible ways) that each method in the test code LMN 408 can be instrumented, to produce instrumented code 502. In portion 504, the instrumented code 502 provides instructions that query the detour manager module 214 for the purpose of determining whether a detour is installed for the particular method in question. The instrumented code 502 can pass any identification information to the detour manager module 214 which identifies the method in question. The detour manager module 214 can respond by indicating whether the detour is installed for this method, e.g., by consulting the dictionary 216 which maintains this information. The detour manager module 214 possesses this detour availability information because it has been previously "attached." Namely, the execution of statement 412 (of FIG. 4), in conjunction with the set operation of the modified part 312, carries out the attach operation.

The instrumented code 502 includes detour code 506 for carrying out operations that are invoked in lieu of the instrumented original method. The instrumented code 502 includes instrumented original method code 508 for carrying out operations associated with the original method. The execution system 104 runs either the detour code 506 or the instrumented original method code 508 depending on the result of the query that is invoked by the instructions in portion 504.

The code instrumentation module 206 can adopt other strategies to produce instrumented code. For example, in another case, the code instrumentation module 206 can produce alternative code 504' in which the selection of detour code or the instrumented original method code can be made by reference to a field variable or the like. This allows the execution system 104 to run the appropriate code without accessing a dictionary maintained by the detour manager module 214.

Having set forth a general explanation of the operation of the isolation system 114 and the execution system 104, Section A closes by providing additional illustrative details regarding the operation of the isolation system 114. More specifically, the isolation system 114 can generate different modified parts for different respective original methods. The following description describes how the isolation system 114 handles different kinds of original methods. The syntax of these examples is merely representative; other coding environments can adopt different respective syntaxes.

Generally, the isolation system 114 converts every data type t in the original product code into a modified type Mt. Further, the isolation system 114 generates at least one settable property for every method in t.

Static Methods

As stated above, for each static method in type t with parameter types $T_1, T_2, \ldots, T_n$ and with return type U, the isolation system 114 generates a settable static property in type Mt. The settable static property has a delegate type Func similar to the following: delegate U Func $(T_1, T_2, \ldots T_n)$.

In one example, the isolation system 114 can name the property by starting with the name of the original static method, and then appending short abbreviations associated with the types of the parameters. This is, of course, one naming rule among many that could be adopted.

FIG. 6 shows a modified part 602 that specifies a property associated with a static method, according to one coding environment.

Instance Methods (for all Instances)

Instance methods, in contrast to static methods, are associated with instances, rather than the class as a whole. In a first case, an instance method is an "all instances" method (pertaining to all instances of the method). In a second case, the instance method is a per instance method (pertaining to individual instances of the method). This subsection addresses the former case (pertaining to the "all instance" scenario).

For each instance method in type t with explicit parameter types $T_1, T_2, \ldots, T_n$ and return type U, the isolation system 114 generates a settable static property in the nested type Mt.AllInstance. This property has a delegate type Func similar to the following: delegate U Func $(t, T_1, T_2, \ldots T_n)$. The first parameter type represents the previously implicit "this" argument of the instance method.

FIG. 6 shows a modified part 604 that specifies a property associated with an instance method, for the all instances scenario. The first argument to AttachDetour and DetachAttach is null, indicating that this detour applies to all instances.

Instance Methods (for a Specific Instances)

This scenario makes it possible to create plural delegate instances based on the same delegate declaration. For each instance method in type t with explicit parameter types $T_1, T_2, \ldots, T_n$ and return type U, the isolation system 114 generates a settable instance property in the type Mt. This property has a delegate type Func similar to the following: delegate U Func $(t, T_1, T_2, \ldots T_n)$. Note that unlike the static property in the nested AllInstances type, there is no provision to pass on the implicit "this" argument of the instance method.

FIG. 6 shows a modified part 606 that specifies a property associated with an instance method, for the individual instance scenario. As shown there, the Mt type has an instance property called "Instance" to access the associated t instance. That is, the first argument to AttachDetour and DetachDetour is this.Instance, indicating that this detour applies to only a specific instance.

As a final point in this section, note that the examples presented herein describe the use of properties and delegates in the particular context of .NET programming languages and the like. However, the terms "properties" and "delegates" have a broader connotation. A delegate refers to any information item in any programming language that can serve as a stand-in for an original method. A property is any information item in any programming language that serves as a reference hook for associating the delegate with the original method.

B. Illustrative Processes

FIGS. 7-11 explain the operation of the functionality 100 of FIG. 1 in flowchart form. Since the principles underlying the operation of the functionality 100 have already been described in Section A, certain operations will be addressed in summary fashion in this section.

Figure 7:
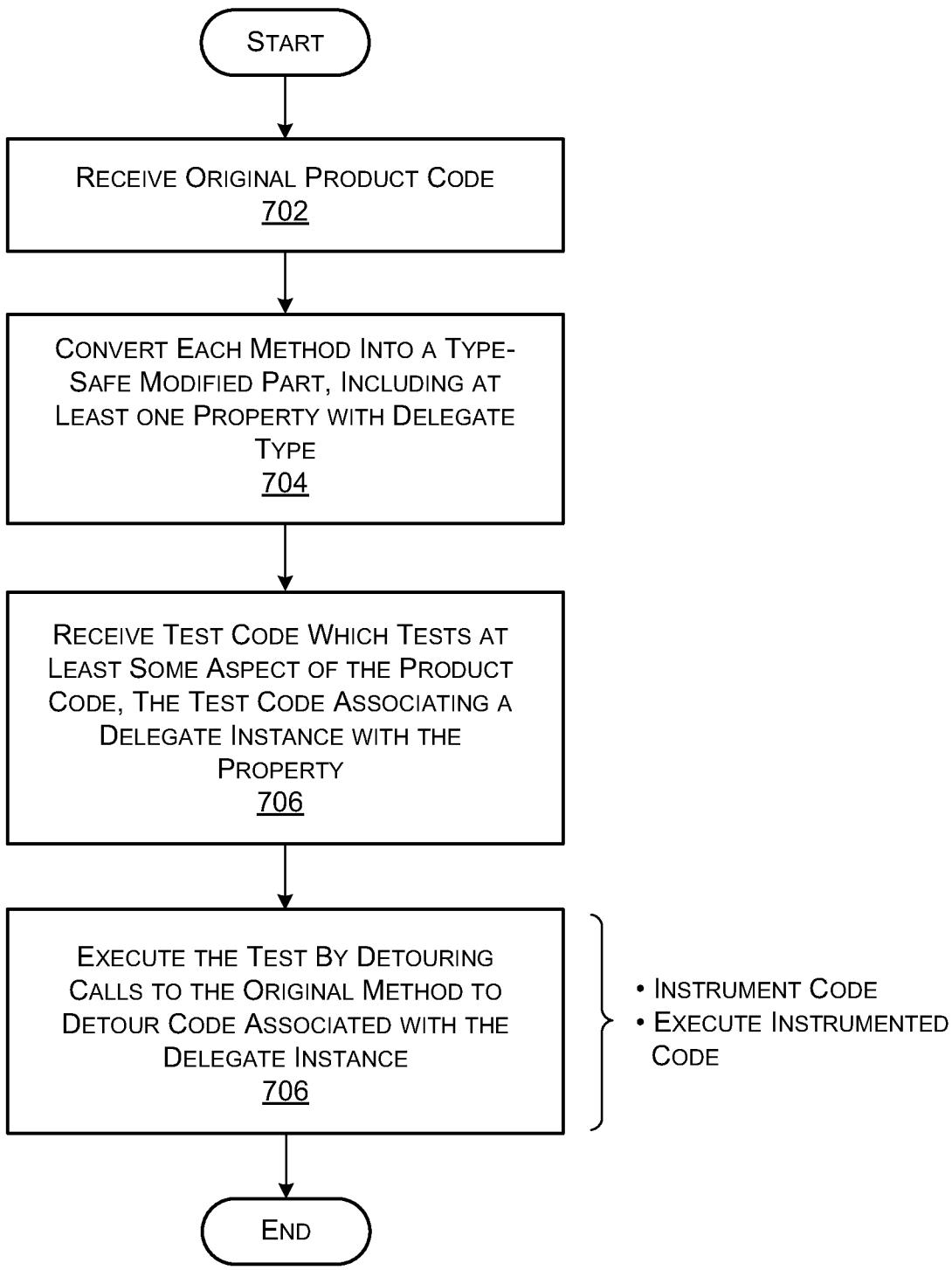
FIG. 7 is a flowchart that presents an overview of a testing operation involving the shunting of environmental dependencies.

Starting with FIG. 7, this figure shows a procedure 700 that represents an overview of the testing operation. In block 702, the isolation system 114 receives the original product code. In block 704, the isolation system 114 converts each method in the original product code into a type-safe modified part. Each type-safe modified part includes at least one property with delegate type.

In block 706, the execution system 104 receives test code which tests at least some aspect of the product code. The test code includes at least one statement which associates a delegate instance with the property generated in block 704. In the case of an instance method, the test code can include plural such statements. In block 706, the execution system 104 executes the test. In the course of execution, the execution system 104 detours method calls to detour code associated with the delegate instance.

More specifically, the execution of the test code in block 706 first entails instrumenting the code in the manner shown in FIG. 5. The execution system 104 then executes the instrumented code. The instrumentation of the code enables the execution system 104 to discover and invoke detour code.

Figure 8:
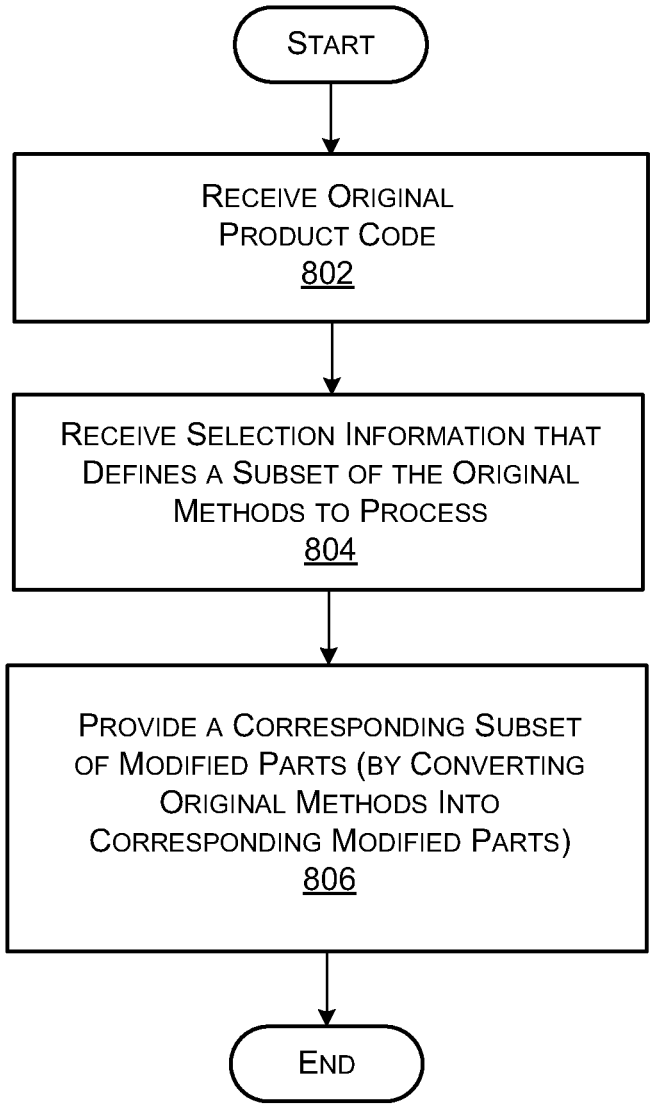
FIG. 8 is a flowchart that presents an overview of one manner of converting original product code into modified code.

FIG. 8 shows a procedure 800 that represents an overview of the isolation operation performed by the isolation system 114. In block 802, the isolation system 114 receives the original product code. In block 804, the isolation system 114 receives selection information (e.g., in an XML file or any other format) that defines a subset of the original methods to process. In block 806, the isolation system converts each method in the subset of methods into a corresponding modified part.

Figure 9:
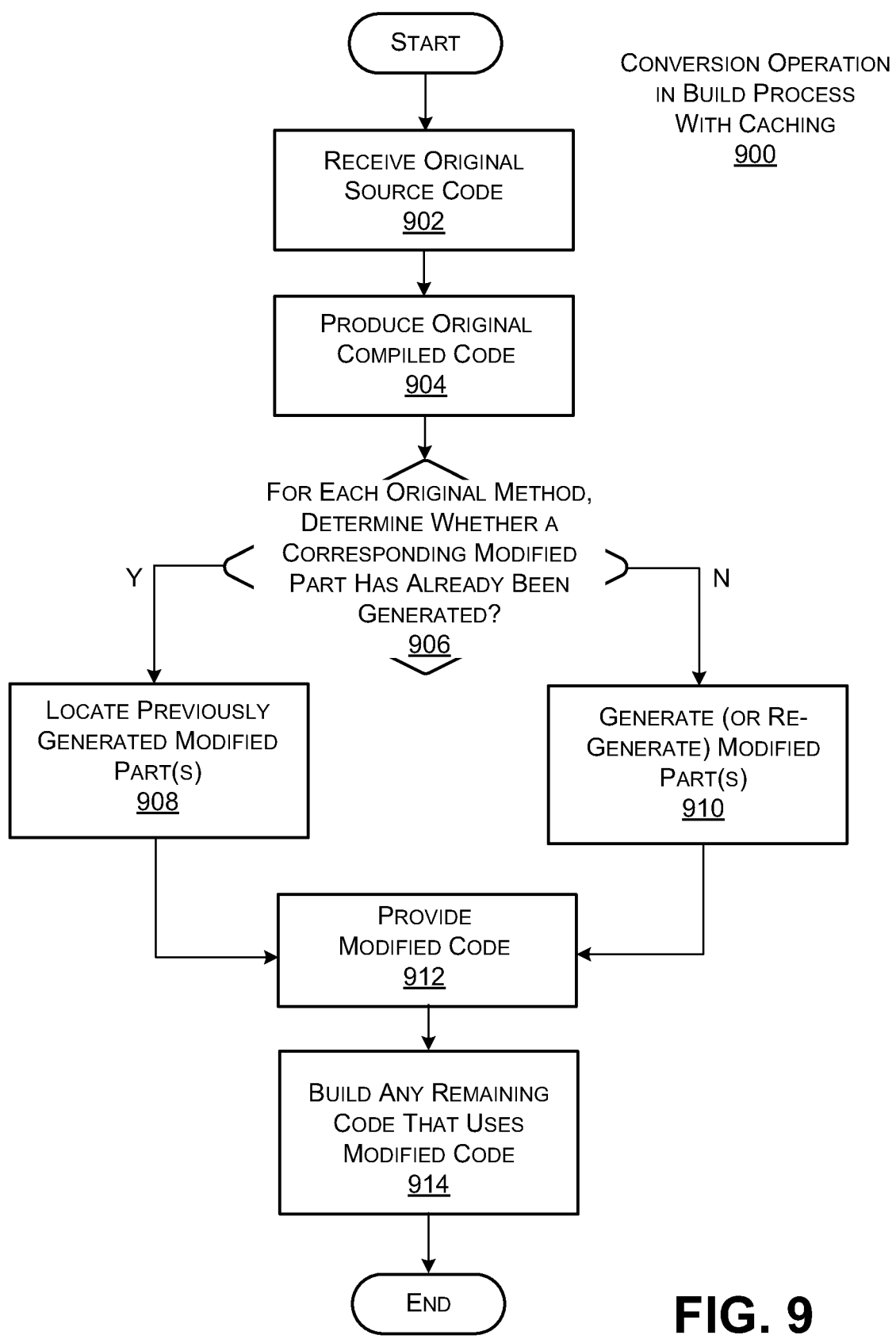
FIG. 9 is a flowchart that describes an illustrative manner of converting original product code into modified code in the course of a build process, leveraging caching of already-converted methods.

FIG. 9 shows a procedure 900 that represents one particular implementation of the overview procedure 800 of FIG. 8. In this case, the isolation operation performed by the isolation system 114 takes place in the course of a build process. In the build process, a language compiler converts source code into intermediate code and performs linking-related tasks.

In block 902, the isolation system 114 receives the original source code. In block 904, the isolation system 114 converts the original source code into original compiled code.

In block 906, the isolation system 114 determines, for each method in the original compiled code, whether a corresponding modified part has already been generated (and stored in cache for reuse). If so, in block 908, the isolation system 114 locates the previously generated and stored modified part. If not, in block 910, the isolation system 114 generates (or regenerates) the modified part. For example, the isolation system 114 can invoke block 910 when it determines that the product code includes new or modified code. In block 912, the isolation system 114 assembles the modified code based on the modified part(s) supplied in block 908 and the modified part(s) supplied in block 910. In another implementation, the isolation system 114 can omit the use of caching.

In block 914, the isolation system 114 builds any remaining code that uses the modified code supplied in block 912. For example, downstream code in the build process may reference the modified code. In that case, the isolation system 114 can use the modified code to properly process that downstream code.

Figure 10:
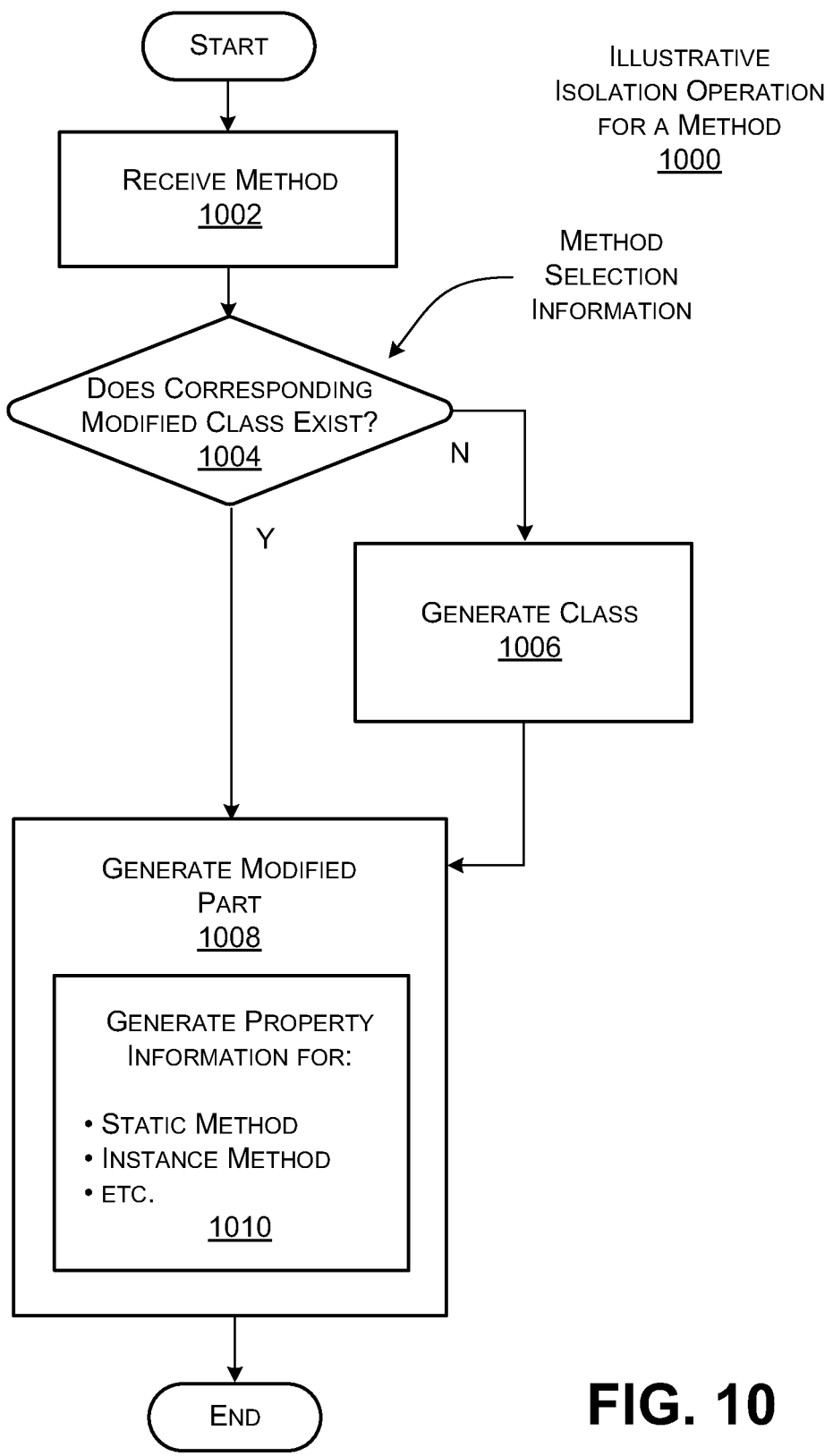
FIG. 10 is a flowchart that describes an illustrative manner of converting an individual original method into a modified part.

FIG. 10 shows a procedure 1000 that represents one manner in which the isolation system 114 can convert an individual original method into a modified part. The original method is associated with an original class. In block 1002, the isolation system 114 receives the original method for processing. In block 1004, the isolation system 114 determines whether there currently exists a modified class corresponding to the original class. If not, in block 1006, the isolation system 114 generates a new class. As explained above, in one case, the isolation system 114 can label the new class by prepending identifying characters (e.g., the letter "M" in the above examples) to the original class name.

In block 1008, the isolation system 114 generates the modified part based on the original method. This entails, as indicated in block 1010, generating a property with the delegate type. The isolation system 114 can generate different types of property information for different respective types of original methods (such as static methods, instance methods, etc.). If the original method is an instance-type method, then the isolation system 114 can generate both a static-related property (e.g., as shown in the exemplary modified part 604) and an instance-related property (e.g., as shown in the exemplary modified part 606).

Figure 11:
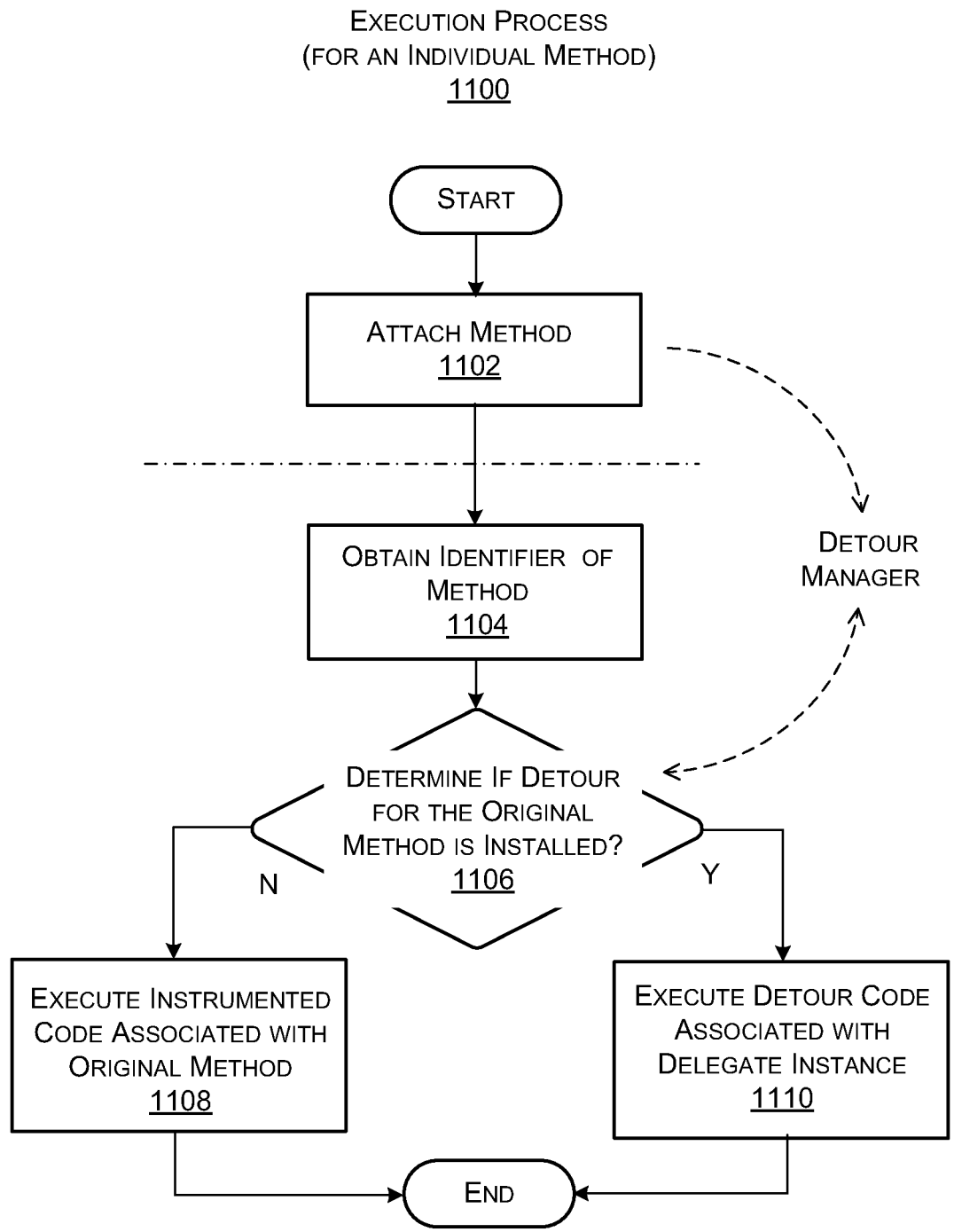
FIG. 11 is a flowchart that describes an illustrative way of executing product code that makes use of dynamic detouring.

FIG. 11 shows a procedure 1100 that presents one manner in which the execution system 104 processes test code that has been generated in the manner of FIG. 4, e.g., by associating a delegate instance with a property. This procedure 1100 is described from the standpoint of processing performed on an individual method that has been instrumented in the manner shown in FIG. 5.

In block 1102, the execution system 104 supplies detour-related information to the detour manager module 214 regarding original methods that are being detoured. More specifically, the execution system 104 can forward this information in response to the processing of statement 412 in FIG. 4 (which associates the property 314 with a delegate instance). The property 314 includes a set operation which effectively registers detour information with the detour manager module 214.

In block 1104, the execution system 104 obtains an identifier associated with the method. In block 1106, the execution system 104 interacts with the detour manager module 214 to determine if a detour has been installed for this particular method.

In block 1008, the execution system 104 executes the instrumented original method code if it determines that a detour is not available. In block 1010, the execution system 104 executes the detour code if it determines that a detour is available.

As mentioned in Section A, the code can alternatively be instrumented to invoke either the detour code or the instrumented original method code without querying the detour manager module 214.

C. Representative Processing Functionality

FIG. 12 sets forth illustrative electrical data processing functionality 1200 that can be used to implement any aspect of the functions described above. With reference to FIG. 1, for instance, the type of processing functionality 1200 shown in FIG. 12 can be used to implement any aspect of the isolation system 114 and/or the execution system 104. In one case, the processing functionality 1200 may correspond to any type of computing device (or plural such devices), each of which includes one or more processing devices.

The processing functionality 1200 can include volatile and non-volatile memory, such as RAM 1202 and ROM 1204, as well as one or more processing devices 1206. The processing functionality 1200 also optionally includes various media devices 1208, such as a hard disk module, an optical disk module, and so forth. The processing functionality 1200 can perform various operations identified above when the processing device(s) 1206 executes instructions that are maintained by memory (e.g., RAM 1202, ROM 1204, or elsewhere). More generally, instructions and other information can be stored on any computer readable medium 1210, including, but not limited to, static memory storage devices, magnetic storage devices, optical storage devices, and so on. The term computer readable medium also encompasses plural storage devices.

The processing functionality 1200 also includes an input/output module 1212 for receiving various inputs from a user (via input modules 1214), and for providing various outputs to the user (via output modules). One particular output mechanism may include a presentation module 1216 and an associated graphical user interface (GUI) 1218. The processing functionality 1200 can also include one or more network interfaces 1220 for exchanging data with other devices via one or more communication conduits 1222. One or more communication buses 1224 communicatively couple the above-described components together.

In closing, the description may have described various concepts in the context of illustrative challenges or problems. This manner of explication does not constitute an admission that others have appreciated and/or articulated the challenges or problems in the manner specified herein.

Further, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An isolation system comprising:
  logic configured to:
    receive original product code, the original product code containing a plurality of original methods, at least one original method being dependent on external functionality that is not under control of a test being performed;
    receive selection information which defines a subset of selected original methods of the plurality of original methods to be processed;
    at a first time, convert each of the selected original methods in the subset of selected original methods of the plurality of original methods into corresponding modified parts declaring type-safe property properties having delegate types;
    at a second time, determine that an individual selected original method in the subset of selected original methods of the plurality of original methods has a corresponding individual modified part that has already been converted and stored; and
    use the individual modified part that has already been converted and stored to invoke associated detour code instead of the individual selected original method; and
  one or more processing devices configured to execute the logic.

2. The isolation system of claim 1, wherein the individual selected original method is a static method, and wherein said logic is further configured to declare a corresponding static-related property for the static method.

3. The isolation system of claim 1, wherein the individual selected original method is an instance method, and wherein said logic is further configured to declare a corresponding instance-related property and a static-related property for the instance method.

4. The isolation system of claim 1, wherein the logic is configured to convert the individual selected original method into an individual modified part with an individual type-safe property having an associated signature which matches a corresponding signature of the individual selected original method.

5. The isolation system of claim 1, wherein each original method is converted at the first time and is cached by the logic for use at the second time.

6. A method for testing original product code using at least one computing device, the method comprising:

receiving the original product code, the original product code containing an original method that is dependent on functionality that is not under control of a test being performed, the original method having an associated original method signature;

converting the original method into a type-safe modified part, the type-safe modified part declaring a property having a delegate type that has a delegate type signature that is based on the original method signature;

receiving test code which tests at least some aspect of the original product code, the test code assigning a delegate instance to the property using at least one statement, wherein the at least one statement prompts an execution system to invoke detour code associated with the delegate instance instead of invoking the original method; and executing the test code using the execution system, the execution system detouring calls to an instrumentation of the original method to the detour code associated with the delegate instance to thereby execute the detour code associated with the delegate instance instead of the instrumentation of the original method.

7. The method of claim 6, wherein the original product code is expressed in a programming language that employs static checking.

8. The method of claim 7, wherein the programming language employs static binding.

9. The method of claim 6, wherein the original product code includes a collection of original methods, and wherein said converting comprises:

receiving selection information that defines a subset of original methods selected from the collection of original methods; and providing a subset of modified parts which are respective corresponding versions of the subset of original methods.

10. The method of claim 9, wherein said converting further comprises:

determining whether each original method in the subset of original methods has a respective corresponding modified part that has already been generated and stored; and using the corresponding modified part that has already been generated and stored when the corresponding modified part exists.

11. The method of claim 6, wherein the original method is defined with respect to an original class, and wherein the type-safe modified part is defined with respect to a modified class, wherein said converting comprises generating the modified class when the modified class has not been previously generated.

12. The method of claim 11, wherein said converting comprises assigning the modified class a name which is a variant of an original class name of the original class.

13. The method of claim 6, wherein the original method is a static method, and wherein the converting comprises declaring a corresponding static-related property.

14. The method of claim 6, wherein the original method is an instance method, and wherein the converting comprises declaring a corresponding instance-related property and a static-related property.

15. The method of claim 6, wherein the delegate type signature which matches the original method signature.

16. The method of claim 6, wherein the property has a set operation for setting detour-related information in a detour manager module, enabling the detour manager module to identify the original method to be detoured.

17. The method of claim 6, wherein said executing comprises instrumenting the original product code to interact with a detour manager.

18. The method of claim 6, wherein said executing comprises:

interacting with a detour manager module to determine that a detour has been installed for the original method; and when the detour is installed, executing the detour code.

19. A volatile or non-volatile hardware memory device or non-volatile hardware storage device storing computer readable instructions, the computer readable instructions providing an isolation system when executed by one or more processing devices, the computer readable instructions comprising:

logic configured to receive an original method that is dependent on functionality that is not under control of a test being performed, wherein the original method has an original method signature specifying at least one of return values or parameters of the original method; and logic configured to convert the original method into a corresponding modified part, the modified part declaring settable property information that is configured to be set, by test code, to associate the settable property information with detour code to be executed in lieu of an instrumentation of the original method, wherein the settable property information has a function signature that matches the original method signature specifying the at least one of the return values or the parameters of the original method.

20. The volatile or non-volatile hardware memory device or non-volatile hardware storage device of claim 19, wherein said logic configured to convert is operative to provide different kinds of settable property information for different respective kinds of methods.

* * * * *